United States Patent [19]

Hernandez et al.

[11] 4,227,972

[45] Oct. 14, 1980

[54] PROCESS FOR RECOVERING PHOSPHATE ESTER TYPE HYDRAULIC FLUIDS FROM INDUSTRIAL WASTE LIQUIDS

[75] Inventors: Pablo M. Hernandez, Waukegan; William J. Luplow, Zion, both of Ill.

[73] Assignee: Outboard Marine Corporation, Waukegan, Ill.

[21] Appl. No.: 901,473

[22] Filed: May 1, 1978

[51] Int. Cl.² .................... B01D 1/22; B01D 3/28; C10M 1/44
[52] U.S. Cl. .................... 203/37; 203/80; 203/89; 203/91; 203/72; 203/39; 72/42; 252/32.5; 260/990
[58] Field of Search .................... 203/36, 37, 39, 73, 203/80, 72, 33, 89, 91; 252/32.5; 260/990; 72/42

[56] References Cited

U.S. PATENT DOCUMENTS

| | | | |
|---|---|---|---|
| 2,895,886 | 7/1959 | Schneider | 203/72 |
| 3,649,721 | 3/1972 | Burrous et al. | 260/990 |
| 3,679,550 | 7/1972 | Orwoll | 260/990 |
| 3,945,891 | 3/1976 | Aal et al. | 260/990 |
| 4,016,048 | 4/1977 | Gerhmann et al. | 203/72 |
| 4,092,378 | 5/1978 | Damiani et al. | 260/990 |
| 4,138,346 | 2/1979 | Nassry et al. | 252/32.5 |

*Primary Examiner*—Wilbur L. Bascomb, Jr.
*Attorney, Agent, or Firm*—Michael, Best & Friedrich

[57] ABSTRACT

Disclosed herein is a process for recovering a phosphate ester type hydraulic fluid from a waste liquid containing water, organic solvents and other impurities, such as polychlorinated biphenyls (PCB). After filtering to remove particulate matter, a heavy fraction separated from the waste liquid and consisting primarily of the hydraulic fluid is first subjected to a distillation step. A substantial portion of the PCB is removed as overhead from the distillation step and the bottoms containing the hydraulic fluid is subsequently evaporated, preferably in a thin film evaporator. The overhead from the evaporation step is condensed to recover the hydraulic fluid.

11 Claims, No Drawings

PROCESS FOR RECOVERING PHOSPHATE ESTER TYPE HYDRAULIC FLUIDS FROM INDUSTRIAL WASTE LIQUIDS

BACKGROUND OF THE INVENTION

This invention relates to a process for recovering phosphate ester type hydraulic fluids from industrial waste liquids and, more particularly, to such a process adapted for use with industrial waste waters also containing polychlorinated biphenyls, organic solvents, and other materials commonly used in connection with die casting operations.

Die casting machines commonly employ relatively expensive fire-resistant hydraulic fluids. Pydraul 50E, a mixture of phosphate esters marketed by Monsanto, is an example of such a hydraulic fluid. Die casting machines typically leak to some degree and the hydraulic fluid along with other materials such as organic solvents, die sprays, die lubricants, die release agents, sawdust, dirt, wash water, etc., end up in floor drains. Because of the high cost, it is highly desirable to recover the hydraulic fluid from the waste water collected in the drain system for reuse.

In the past, fluids including polychlorinated biphenyls (PCB) have been used in die casting machines. Some die casting machines still contain some of these fluids. Present government regulations impose stringent disposal requirements on materials containing PCB. Any leakage of these older fluids into floor drainage systems could result in the waste water having a PCB content above an acceptable level.

SUMMARY OF THE INVENTION

The invention provides a method for recovering phosphate ester type hydraulic fluids from a waste liquid also containing water organic solvents, and other impurities, which method includes the steps of distilling the waste liquid at a temperature of about 190° to about 260° C. and at a pressure of about 2 to about 30 mm Hg, removing water, low boiling organic solvents and other low boiling impurities as an overhead from the distillation step, removing the hydraulic fluid and high boiling impurities as bottoms from the distillation step, evaporating the bottoms from the distillation step, preferably in a thin film evaporator, at a temperature of about 260° to about 380° C. and at a pressure up to about 5 mm Hg, removing the high boiling impurities as bottoms from the evaporation step, removing the hydraulic fluid as an overhead from the evaporation step, and condensing this overhead to recover the hydraulic fluid. All pressures indicated herein, including those listed in Tables I–IV below, are absolute.

If the waste liquid also contains PCB, a substantial portion is removed with the overhead from the distillation step and a portion is removed with the bottoms or residue from the evaporation step.

In one embodiment, the acidity of the waste liquid is determined prior to the distillation step and, if the acidity is above 0.15, a sufficient amount of a basic alkali metal or alkaline earth metal compound is added to reduce the acidity to less than 0.15.

In one embodiment, the acidity of the recovered hydraulic fluid is determined and, if above about 0.15, the fluid is treated, such as by passing through an activated alumina filter medium to remove or neutralize the acidic components and thereby reduce the acidity to less than 0.15.

One of the principal features of the invention is the provision of a process for recovering phosphate ester type hydraulic fluid from a waste liquid also containing water, organic solvents and other impurities.

Another principal feature of the invention is the provision of such a process which is capable of removing a substantial portion of any PCB contained in the waste liquid.

A further principal feature of the invention is the provision of such a process which is capable of recovering a high percentage of the hydraulic fluid in a purified form quite similar to that of the original fluid.

Other features and advantages of the invention will become apparent to those skilled in the art upon reviewing the following detailed description and the appended claims.

GENERAL DESCRIPTION

The process of the invention is suitable for recovering phosphate ester type hydraulic fluids, such as Pydraul 50E mentioned above, from a waste liquid also containing water, organic solvents, and other similar impurities. The process is conveniently adapted to either a batch or continuous flow operation and is particularly suitable for recovering the above type hydraulic fluids from a waste water collected in the floor drainage system of a die casting facility. Such waste liquids typically include water, a hydraulic fluid, organic solvents (particularly aliphatic solvents), die sprays, die lubricants, mold release agents, saw dust, dirt, and other impurities. The waste water collected in a floor drainage system of a die casting facility employing machines containing fluids including PCB may also contain small amounts of PCB. The process of the invention is capable of removing a substantial portion of the PCB for safe disposal, such as by incineration.

The waste water from the floor drainage system, after being filtered to remove particulate matter, preferably is transferred to a settling tank or the like wherein the hydraulic fluid and other heavier components are allowed to settle by gravity. A heavy fraction or the settled portion containing the heavier components is removed from the settling tank and subjected to distillation. This heavy fraction typically contains about 70 to 90 weight % of the hydraulic fluid.

The distillation step preferably is performed under conditions for flash distillation and generally is operated at a temperature of about 190° to about 260° C. and at a pressure of about 2 to about 3 mm Hg. Under these conditions, approximately 2 to 10 weight % of the feed is removed as an overhead and the overhead is principally water, low boiling organic solvents, other low boiling impurities and a portion of the PCB (if any) in the waste liquid. The hydraulic fluid, high boiling impurities and a portion of the PCB (if any) are removed as a liquid bottoms which amounts to about 90 to 98 weight % of the feed. The preferred temperature is about 200° to about 220° C. and the preferred pressure is about 8 to about 15 mm Hg.

In cases where the acidity number or value of the feed to the distillation step is above 0.15, it is preferable to add a sufficient amount of a basic alkali or alkaline earth metal compound as a neutralizing agent to reduce the acidity to less than 0.15. While various suitable basic alkali or alkaline earth metal compounds can be used, the hydroxides of potassium, sodium, calcium and magnesium are preferred with potassium hydroxide and sodium hydroxide being the most preferred. Alcoholic solutions (e.g., isopropanol and ethanol) of about 0.1 to about 0.5 N have been found to be particularly effective for this purpose. Amounts of the neutralizing agent substantially in excess of that required to reduce the acidity to 0.15 should be avoided in order to minimize the formation of excessive amounts of metal salts. As used herein, the term "acidity" or "acidity number" is expressed as milligrams of sodium hydroxide required to neutralize 1 gram of the liquid being measured.

The overhead from the distillation step is cooled and the condensate containing PCB is disposed in a suitable manner.

The liquid bottoms from the distillation step are evaporated to obtain the hydraulic fluid as an overhead. The evaporation step preferably is performed in a conventional thin film evaporator operated at a temperature of about 260° to about 380° C. and at a pressure up to about 5 mm Hg. Under these conditions, approximately 85 to 98 weight % of the feed is removed overhead, the overhead stream being primarily the hydraulic fluid. High boiling impurities including a portion of the PCB (in any) in the feed to the thin film evaporator are removed as bottoms or residue, which amounts to about 2 to 15 weight % of the feed. The preferred temperature is about 285° to about 370° C. and the preferred pressure is about 0.5 to about 3 mm Hg.

The overhead from the thin film evaporator is condensed to recover the hydraulic fluid which usually has a viscosity and other properties approximating those of the original fluid. In some cases, the acidity of the recovered hydraulic fluids may be higher than about 0.15, indicating the presence of an excess amount of oxidation products and other undesirable acidic components. Accordingly, it is preferred to measure the acidity of the recovered hydraulic fluid and, if the acidity is above 0.15, treat the hydraulic fluid in a suitable manner to remove and/or neutralize a sufficient amount of these components to lower the acidity to less than 0.15. A preferred technique involves passing the recovered hydraulic fluid through a suitable filter medium, such as clay or activated alumina. The latter medium is particularly effective because it can be readily reactivated and reused. When the hydraulic fluid is treated in this manner, it is usually heated (batch process) or cooled (continuous process) to about 60° to 85° C. prior to being pulled through the filter medium by a vacuum pump or the like.

For the process of the invention, up to 97% or more of the original hydraulic fluid can be recovered from a waste liquid containing water, organic solvents, PCB and other impurities. Also, the amount of PCB (if any) in the hydraulic fluid can be reduced by 70% or more. Generally, there is some trade off when the operating conditions during the distillation and evaporation steps are varied to maximize either recovery of the hydraulic fluid or removal of PCB. That is, an increase in the amount of hydraulic fluid recovered generally results in a decrease in the amount of PCB removed and vice versa.

Without further elaboration, it is believed that one skilled in the art, using the preceding description, can utilize the present invention to its fullest extent. The following example is presented for the purpose of illustrating the process of the invention and is not to be construed as limitations to the scope of the invention.

EXAMPLE

A series of tests were performed on samples of a waste water collected from a floor drainage system in a die casting facility. After filtering to remove particulate matter, the waste water was transferred to a settling vessel to permit gravity separation of heavier components. A heavy fraction, consisting primarily of a phosphate ester type hydraulic fluid (Pydraul 50E) and also containing water, a naptha-type solvent, lubricants, die spray and 530–560 ppm PCB, separated from the waste water was used as the test sample.

A conventional hot oil jacketed thin film evaporator was used for both the distillation and the evaporation steps. The wiper blades of the evaporator were operated at 1800 RPM and the cylindrical area wiped by the blades was 1.4 square feet.

The heavy fraction (Feed) was introduced into the evaporator which initially was operated at temperature (jacket temperature or 239°–240° C.) and pressure conditions to effect flash distillation of water and lower boiling impurities. Water, a substantial portion of PCB and lower boiling impurities, such as the naptha-type solvent, were removed as overhead (O.H.) and the hydraulic fluid and high boiling materials were removed as bottoms (Botts.). The operating conditions for flash distillation and the amount of PCB removed in each run are set forth in Tables I and II, respectively.

The liquid bottoms from the first pass through the evaporator were fed into the evaporator which was then operated at temperature (jacket temperature of 338°–339° C.) and pressure conditions to effect evaporation of the hydraulic fluid. The overhead stream was condensed to recover the hydraulic fluid. Higher boiling point impurities were removed as bottoms or residue from the evaporator. The operating conditions for the second pass are set forth in Table III. The amount and characteristics of the recovered hydraulic fluid are set forth in Table IV.

From these results, it can be seen that the process of the invention is capable of removing a substantial portion of PCB and yet obtain a high recovery of the hydraulic fluid having a viscosity within the range of that for the original fluid, i.e., 200–230 (s.u.s. ) The fluid otherwise was acceptable for re-use. It also can be seen that operating conditions which provide an increase in the amount of PCB removed results a concomitant reduction in the amount of hydraulic fluid recovered.

From the foregoing description, one skilled in the art can easily ascertain the essential characteristics of the invention and, without departing from the spirit and scope thereof, make various changes and modifications to adapt the invention to various uses and conditions.

TABLE I

| | Operating Conditions for Flash Distillation | | | | | | |
|---|---|---|---|---|---|---|---|
| | Flow Rates, lbs/hr. | | | Temperature, °C. | | | Pressure |
| Run | Feed | Botts. | O.H. | Feed | Botts. | O.H. | mm Hg. |
| 1 | 40 | 38.4 | 1.6 | 168 | 206 | 92 | 10 |
| 2 | 54.4 | 52.2 | 2.2 | 162 | 206 | 97 | 10 |
| 3 | 67.2 | 64.8 | 2.4 | 155 | 204 | 99 | 10 |

TABLE II

| | PCB Removal During Flash Distillation | | |
|---|---|---|---|
| | PCB Content, ppm | | |
| Run | Feed | Botts. | % PCB Removed |
| 1 | 560 | 290 | 48 |

TABLE II-continued

PCB Removal During Flash Distillation

| | PCB Content, ppm | | |
|---|---|---|---|
| Run | Feed | Botts. | % PCB Removed |
| 2 | 530 | 360 | 32 |
| 3 | 550 | 530 | 4 |

TABLE III

Operating Conditions for Thin Film Evaporation

| | Flow Rates, lbs/hr. | | | Temperature, °C. | | | Pressure, |
|---|---|---|---|---|---|---|---|
| Run | Feed | Botts. | O.H. | Feed | Botts. | O.H. | mm Hg. |
| 4 | 42.1 | 3.84 | 38.3 | 210 | 263 | 253 | 1.5 |
| 5 | 47.8 | 3.3 | 44.5 | 220 | 256 | 253 | 1.5 |
| 6 | 48.5 | 2.2 | 46.3 | 219 | 239 | 257 | 1.5 |
| 7 | 56.6 | 1.65 | 54.9 | 215 | 235 | 260 | 3.5 |
| 8 | 67.2 | 2.9 | 64.3 | 216 | 230 | 258 | 2.5 |
| 9 | 77.0 | 4.8 | 72.2 | 226 | 245 | 258 | 3.0 |

TABLE IV

Characteristics of Recovered Hydraulic Fluid and Residue

| | Recovered Hydraulic Fluid | | PCB, ppm | |
|---|---|---|---|---|
| | | Viscosity, | | |
| Run | % Recovery | s.u.s at 100° F. | Hydraulic Fluid | Residue |
| 4 | 90 | 206 | 430 | 79 |
| 5 | 93 | 208 | 420 | 53 |
| 6 | 95 | 212 | 460 | 11 |
| 7 | 97 | 214 | 490 | 2.7 |
| 8 | 96 | 210 | 510 | 42 |
| 9 | 94 | 203 | 450 | 13 |

What is claimed is:

1. A process for recovering a phosphate ester type hydraulic fluid from a waste liquid containing water, organic solvents and other impurities, which process comprises the steps of distilling the waste liquid at a temperature of about 190° to about 260° C. and at a pressure of about 2 to about 30 mm Hg, removing water, low boiling organic solvents, and other low boiling impurities as an overhead from the distillation step, removing the hydraulic fluid and high boiling impurities as liquid bottoms from the distillation step, evaporating the bottoms from the distillation step at a temperature of about 260° to about 380° C. and a pressure up to about 5 mm Hg, removing high boiling impurities as bottoms from the evaporation step, removing the hydraulic fluid as an overhead from the evaporation step, and condensing the overhead from the evaporation step to recover the hydraulic fluid.

2. A process according to claim 1 wherein the waste liquid also contains polychlorinated biphenyls, a substantial portion of the polychlorinated biphenyls being removed in the overhead from the distillation step and another portion of the polychlorinated biphenyls being removed in the bottoms from the evaporation step.

3. A process according to claim 1 wherein the evaporation step is carried out in a thin film evaporator.

4. A process according to claim 1 including the steps of determining the acidity of the waste liquid prior to the distillation step and, if above about 0.15, adding thereto a sufficient amount of a basic alkali or alkaline earth metal compound to reduce the acidity to less than 0.15.

5. A process according to claim 4 wherein said compound is a hydroxide of potassium, sodium, calcium or magnesium.

6. A process according to claim 5 wherein said compound is sodium hydroxide or potassium hydroxide.

7. A process according to claim 4 including the step of determining the acidity of the recovered hydraulic fluid and, if above 0.15, treating the hydraulic fluid to remove or neutralize a sufficient amount of the acidic components to lower the acidity of less than 0.15.

8. A process according to claim 7 wherein the recovered hydraulic fluid is passed through a filter medium to lower the acidity to less than 0.15.

9. A process according to claim 8 wherein said filter medium is an activated alumina.

10. A process according to claim 7 wherein the distillation step is carried out at a temperature of about 200° to about 220° C. and at a pressure of about 8 to about 15 mm Hg.

11. A process according to claim 9 wherein the evaporation step is carried out at a temperature of about 285° to about 370° C. and at a pressure of about 0.5 to about 3 mm Hg.

* * * * *